(12) United States Patent
Barnes

(10) Patent No.: US 9,475,246 B2
(45) Date of Patent: *Oct. 25, 2016

(54) METHOD OF MOLDING AND MOLD WITH SUCCESIVE STAGE COOLING CHANNELS

(71) Applicant: F&S Tool, Inc., Erie, PA (US)

(72) Inventor: Thomas D Barnes, Erie, PA (US)

(73) Assignee: F&S TOOL, INC., Erie, PA (US)

(*) Notice: Subject to any disclaimer, the term of this patent is extended or adjusted under 35 U.S.C. 154(b) by 522 days.

This patent is subject to a terminal disclaimer.

(21) Appl. No.: 14/049,568

(22) Filed: Oct. 9, 2013

(65) Prior Publication Data

US 2014/0035194 A1   Feb. 6, 2014

Related U.S. Application Data

(63) Continuation of application No. 13/277,022, filed on Oct. 19, 2011, now Pat. No. 8,585,392, which is a continuation-in-part of application No. 13/114,327, filed on May 24, 2011.

(51) Int. Cl.
*B29D 99/00* (2010.01)
*B29C 33/04* (2006.01)
(Continued)

(52) U.S. Cl.
CPC .......... *B29D 99/0096* (2013.01); *B29C 33/04* (2013.01); *B29C 43/52* (2013.01); *B29C 45/73* (2013.01); *B29C 45/7312* (2013.01)

(58) Field of Classification Search
CPC ....... B29C 33/04; B29C 43/52; B29C 45/73; B29C 45/7312; B29C 45/7331; B29C 2045/735; B29C 2045/7368

USPC .................................. 425/547, DIG. 246
See application file for complete search history.

(56) References Cited

U.S. PATENT DOCUMENTS 2,828,509 A * 4/1958 Smucker ................. B29C 45/26
425/437
3,373,479 A   3/1968 Watt et al.
(Continued)

FOREIGN PATENT DOCUMENTS

DE   10 2006 028 149 A1   12/2007
DE       102006028149 A1   12/2007
(Continued)

OTHER PUBLICATIONS

"Cooling System Modeling Techniques", Advanced CAE Technology Inc, 1986-1998, 13 pages. http://www.dc.engr.scu.edu/cmdoc/cl_doc/a_modeli.htm.*

(Continued)

*Primary Examiner* — Alison L Hindenlang
*Assistant Examiner* — Emmanuel S Luk
(74) *Attorney, Agent, or Firm* — The Marbury Law Group, PLLC

(57) ABSTRACT

Various embodiments provide methods and apparatus for cooling a mold in a compression molding assembly, thereby enabling increased cycling speed and efficiency. Embodiments include a coolant flow path that transports a fluid coolant into and out of a cooling ring around the molding assembly's core. The coolant flow path may divide into several channels within the cooling ring. The coolant flow path may also include a series of stages with varying volumes or cross sectional areas designed to regulate the flow of coolant.

26 Claims, 7 Drawing Sheets

(51) Int. Cl.
*B29C 45/73* (2006.01)
*B29C 43/52* (2006.01)

(56) References Cited

U.S. PATENT DOCUMENTS

| | | | |
|---|---|---|---|
| 3,660,001 A | 5/1972 | Roehr | |
| 3,913,660 A | 10/1975 | Diez | |
| 4,091,069 A * | 5/1978 | Allen | B29C 45/34 |
| | | | 249/79 |
| 4,130,264 A | 12/1978 | Schroer | |
| 4,533,312 A | 8/1985 | Von Holdt | |
| 4,541,605 A | 9/1985 | Kubota et al. | |
| 4,622,001 A | 11/1986 | Bright et al. | |
| 4,731,014 A | 3/1988 | Von Holdt | |
| 4,771,981 A | 9/1988 | Little et al. | |
| 4,861,257 A | 8/1989 | Siotani | |
| 4,915,609 A | 4/1990 | Hahn | |
| 4,966,544 A * | 10/1990 | Mitake | B29C 45/7312 |
| | | | 249/111 |
| 5,096,410 A | 3/1992 | Loulourgas | |
| 5,114,655 A | 5/1992 | Cole | |
| 5,383,780 A | 1/1995 | McCready et al. | |
| 5,403,179 A | 4/1995 | Ramsey | |
| 5,630,977 A | 5/1997 | Catalanotti et al. | |
| 5,700,415 A | 12/1997 | Hiroki et al. | |
| 5,798,074 A | 8/1998 | McCready et al. | |
| 5,855,933 A * | 1/1999 | Schmetz | B29C 33/04 |
| | | | 228/174 |
| 5,925,303 A | 7/1999 | Scheliga | |
| 5,935,621 A * | 8/1999 | Gellert | B29C 45/7312 |
| | | | 425/549 |
| 6,017,209 A * | 1/2000 | Gellert | B29C 45/2711 |
| | | | 425/549 |
| 6,030,202 A * | 2/2000 | Gellert | B29C 45/27 |
| | | | 425/549 |
| 6,077,067 A * | 6/2000 | Gellert | B29C 45/7312 |
| | | | 264/328.16 |
| 6,079,972 A * | 6/2000 | Gellert | B29C 45/7312 |
| | | | 264/328.16 |
| 6,099,785 A | 8/2000 | Schweigert et al. | |
| 6,168,740 B1 * | 1/2001 | Koch | B29C 45/73 |
| | | | 264/237 |
| 6,176,700 B1 | 1/2001 | Gellert | |
| 6,220,850 B1 | 4/2001 | Catoen et al. | |
| 6,276,922 B1 * | 8/2001 | Huston | B29C 45/7312 |
| | | | 425/526 |
| 6,488,881 B2 | 12/2002 | Gellert | |
| 6,506,330 B1 | 1/2003 | Schweigert et al. | |
| 6,551,093 B2 | 4/2003 | Taha | |
| RE38,265 E * | 10/2003 | Gellert | B29C 45/7312 |
| | | | 425/549 |
| 7,232,306 B2 | 6/2007 | Dunman | |
| 7,252,497 B2 | 8/2007 | Neter et al. | |
| 7,293,341 B2 | 11/2007 | Zydron | |
| 7,361,009 B2 | 4/2008 | Li | |
| 7,364,688 B2 | 4/2008 | Neter et al. | |
| 7,381,049 B2 | 6/2008 | Li et al. | |
| 7,425,293 B2 | 9/2008 | Parrinello et al. | |
| 7,645,132 B2 | 1/2010 | McCready | |
| 7,798,806 B2 | 9/2010 | Neter et al. | |
| 7,934,920 B2 | 5/2011 | Rote et al. | |
| 8,585,392 B2 * | 11/2013 | Barnes | B29C 33/04 |
| | | | 425/384 |
| 2001/0016239 A1 | 8/2001 | Koch et al. | |
| 2002/0001637 A1 | 1/2002 | Taha | |
| 2003/0064128 A1 * | 4/2003 | Byrnes | B29C 45/7312 |
| | | | 425/552 |
| 2005/0194709 A1 | 9/2005 | Dunman | |
| 2007/0092596 A1 | 4/2007 | Li | |
| 2007/0212443 A1 | 9/2007 | Li | |
| 2008/0087627 A1 | 4/2008 | Zuffa | |
| 2009/0152770 A1 | 6/2009 | Mikac | |
| 2009/0324770 A1 | 12/2009 | Schweininger et al. | |
| 2010/0183763 A1 | 7/2010 | Babin et al. | |
| 2010/0297287 A1 | 11/2010 | Neter et al. | |
| 2012/0301572 A1 * | 11/2012 | Barnes | B29C 33/04 |
| | | | 425/552 |
| 2015/0044323 A1 * | 2/2015 | Penazzi | B29C 33/04 |
| | | | 425/469 |

FOREIGN PATENT DOCUMENTS

| | | |
|---|---|---|
| EP | 1825988 A1 | 8/2007 |
| JP | 57-156231 A | 9/1982 |
| JP | 60-112413 A | 6/1985 |
| JP | 62-279914 A | 12/1987 |
| JP | 05-057760 A | 3/1993 |
| KR | 20-1999-0018904 U | 6/1999 |
| KR | 10-2005-0071679 U | 7/2005 |
| WO | 00/48815 A1 | 8/2000 |

OTHER PUBLICATIONS

International Search Report and Written Opinion issued in PCT Application No. PCT/US2012/037985, mailed on Jan. 31, 2013.

Extended European Search Report issued for European Application No. 12790229, mailed on Oct. 6, 2014.

Chinese Office Action CN Application No. 201280030178.X issued May 25, 2016.

International Preliminary Report on Patentability; International Application No. PCT/US2012/037985; mailed Dec. 5, 2013.

* cited by examiner

METHOD OF MOLDING AND MOLD WITH SUCCESIVE STAGE COOLING CHANNELS

RELATED APPLICATIONS

This application is a continuation of U.S. patent application Ser. No. 13/277,022 filed Oct. 19, 2011 entitled "Compression Molding with Successive Stage Cooling Channels", which is a continuation-in-part of U.S. patent application Ser. No. 13/114,327 filed May 24, 2011, both of which are hereby incorporated herein by reference in their entirety.

BACKGROUND

Compression molding is a known manufacturing process for producing molded objects from various plastics. Plastic material is placed in an open mold cavity. A plug or other forcing member then closes the mold and compresses the material to expand to the shape of the mold cavity. The mold opens and the part is ejected. The plastic material is generally preheated, sometimes above the melting point, to make the plastic material more flexible for molding. Once the plastic material is compressed into the form of the mold cavity, the molded plastic may be ejected and the cycle repeated. This process may be repeated frequently to make a large number of molded objects quickly. To enable high speed operation, the mold may be actively cooled.

SUMMARY

Various embodiment assemblies include a compression molding assembly for molding a plastic material featuring a coolant flow path including a plurality of stages, wherein at least one of the plurality of stages has a combined cross sectional area greater than the other stages, and wherein the coolant flow path is configured to cool a center core of the compression molding assembly.

Further embodiments include a compression molding device for molding a plastic material including a bubbler with a bubbler inlet and a bubbler outlet, a center core located at an end of the bubbler with a plurality of center core inlets and a plurality of center core outlets, a cooling ring disposed around the center core with a plurality of internal grooves, a plurality of traversing channels, a plurality of arcuate grooves, and a plurality of external grooves, and a thread core disposed around the cooling ring, wherein the bubbler, the center core, the cooling ring, and the thread core are configured such that a fluid coolant may flow through the bubbler input, the plurality of center core inlets, a plurality of internal channels bounded by the plurality of internal grooves and the center core, the plurality of traversing channels, a plurality of arcuate channels bounded by the plurality of arcuate grooves and the thread core, a plurality of external channels bounded by the plurality of external grooves and the thread core, the plurality of center core outlets, and the bubbler outlet.

Further embodiments include a method for cooling a compression molding device with a fluid coolant, the compression molding device including a bubbler, a center core, a cooling ring, and a thread core. The method includes directing the fluid coolant into a bubbler inlet of the bubbler, directing the fluid coolant into a plurality of center core inlets of the center core, directing the fluid coolant into a plurality of internal channels bounded by a plurality of internal channels of the cooling ring and the center core, directing the fluid coolant into a plurality of traversing channels of the cooling ring, directing the fluid coolant into a plurality of arcuate channels bounded by a plurality of arcuate grooves of the cooling ring and the thread core, directing the fluid coolant into a plurality of external grooves of the cooling ring, directing the fluid coolant into a plurality of center core outlets of the center core, and directing the fluid coolant into a bubbler outlet of the bubbler.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1A:
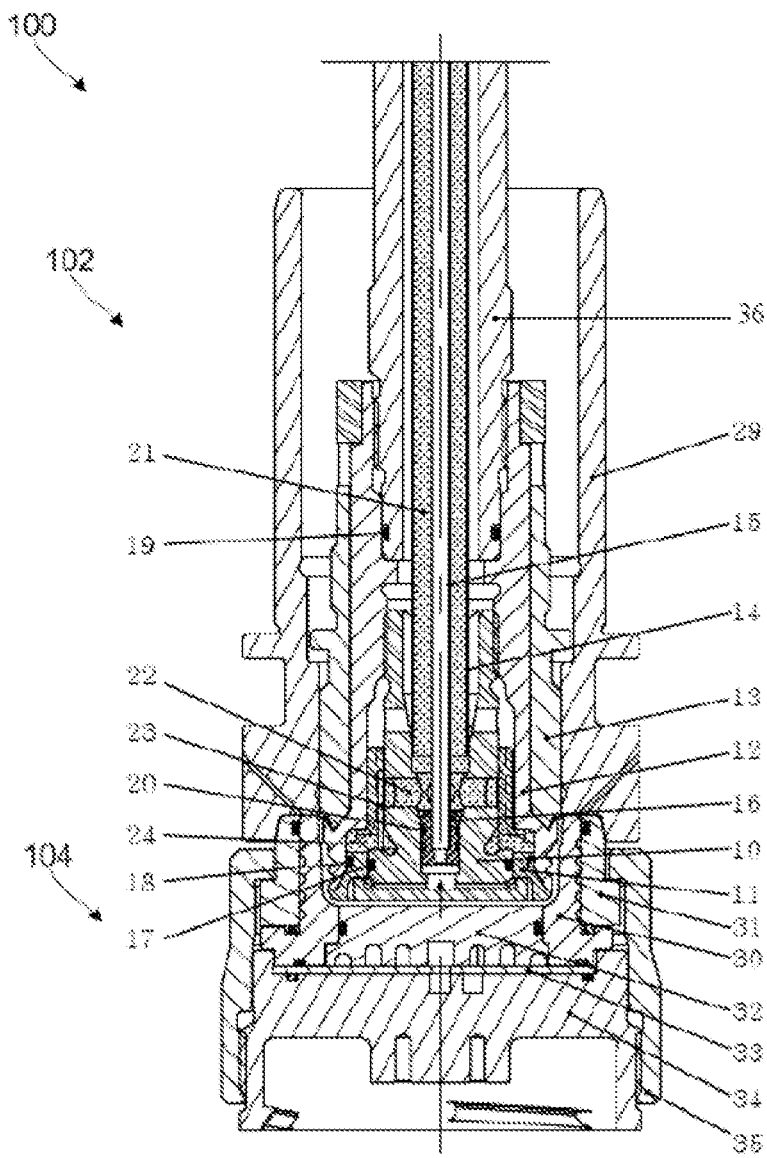
FIG. 1A is a cross sectional view of a cavity stack showing a coolant flow path into the stack.

The present assemblies, devices, and methods will be described in more detail hereinafter with reference to the accompanying drawings, in which embodiments of the inventions are shown. The assemblies, devices, and methods, however, may be embodied in many different forms and should not be construed as limited to the embodiments set forth herein; rather, the present embodiments are provided so that the subject disclosure will be thorough and complete, and will convey the scope of the invention to those skilled in the art. Like numbers refer to like elements throughout.

The following is a list of numbers and their associated elements that appear in the drawings and the following description of the various embodiments:

10 Center Core
11 Cooling Ring
12 Thread Core
13 Tamper Band Core
14 Bubbler Tube
15 Air Tube
16 Air Plug
17 O-Ring—Center Core
18 O-Ring—Cooling Ring
19 O-Ring—Mandrel
20 O-Ring—Air Plug
21 Coolant Flow Path—Bubbler Inlet
22 Coolant Flow Path—Center Core Inlet
23 Coolant Flow Path—Internal Channels in Cooling Ring
24 Coolant Flow Path—Traversing Channels in Cooling Ring
25 Coolant Flow Path—Arcuate Channels in Cooling Ring
26 Coolant Flow Path—External Channels in Cooling Ring 27 Coolant Flow Path—Center Core Outlet
28 Coolant Flow Path—Bubbler Outlet
29 Stripper
30 Cavity
31 Outer Ring
32 Cavity Bottom
33 Cover Plate
34 Adapter
35 Machine Nut
36 Mandrel
100 Compression Molding Assembly
102 Upper Assembly
104 Base Assembly
106 External Threads of the Thread Core
108 Plug Seal Gaps
110 Internal Assembly Threads of the Thread Core
112 Coolant Flow Path In this description, the term "exemplary" is used herein to mean "serving as an example, instance, or illustration." Any implementation described herein as "exemplary" is not necessarily to be construed as preferred or advantageous over other implementations.

The various embodiments provide methods and devices for cooling a compression molding assembly, thereby enabling increased cycling speed and efficiency. Embodiments provide coolant flow paths through a mold assembly through which a coolant fluid (e.g., water) flows into and out of a cooling ring around the molding assembly's core. The coolant flow path may divide into several channels within and around the cooling ring to enable efficient heat transfer and more uniform thermal profiles within the mold assembly than achieved in conventional designs. The coolant flow path may include a series of stages with varying volumes or cross sectional dimensions configured to regulate the flow of coolant. Embodiment methods and devices may enable greater production rates with lower coolant flow rates.

FIG. 1A is a cross sectional view of an embodiment compression molding assembly 100 that may be used for molding plastic caps. Molding assembly 100 may comprise an upper assembly 102 and a base assembly 104. The upper assembly 102 may include may include a stripper 29, a tamper band core 13, a thread core 12, a cooling ring 11, a center core 10, and a mandrel 36.

In operation, the center core 10 may contact and compress a plastic material (not shown). A cooling ring 11 may be configured around the center core 10. A first end of a thread core 12 may be configured around the cooling ring 11. The thread core 12, cooling ring 11, and center core 10 may all be concentric about a central axis as shown in FIG. 1A.

A second end of the thread core 12 may be assembled about a mandrel 36. In the embodiment illustrated in FIG. 1A, the thread core 12 is positioned within a tamper band core 13 which forms tamper bands of the caps. However, the tamper band core 13 is optional, and an embodiment without this component is described below with reference to FIGS. 5 and 6. The tamper band core 13 may be assembled within a stripper 29, which may push a formed cap from the mold assembly 100 after the cap is formed. In operation the base assembly 104 may move relative to upper assembly 102 to compress plastic material within the volume between the two assemblies.

The base assembly 104 may include a cavity 30 with a cavity bottom 32. During operation, plastic material may be loaded within the cavity 30 and compressed by moving the upper or base assemblies relative to one another. Typically, the upper assembly 102 is threaded into a carousel while the base assembly 104 is attached to a press mechanism (e.g., a hydraulic ram) that raises and lowers the base assembly with respect to the upper assembly 102. The compressed plastic material assumes the shape of the open space within the mold cavity between the base assembly 104 and upper assembly 102. For example, in the assembly 100 of FIG. 1A the compressed plastic material fills the boundaries of the cavity 30 and cavity bottom 32.

The base assembly 104 may also include an outer ring 31 and a cover plate 33. The base assembly 104 may be loaded onto an adapter 34, which may be threaded into a support or press mechanism. A machine nut 35 may include a lip that fits around the outer ring 31 and acts to retain the base assembly 104 with the support or press mechanism.

The upper mold assembly 102 shown in FIG. 1A may include a bubbler tube 14 and an air tube 15 within the mandrel 36. The air tube 15 and the bubbler tube 14 may be concentric about the longitudinal axis of the mandrel 36 with the air tube 15 disposed within the bubbler tube 14. The air tube 15 may extend to an air plug 16 within the center core 10. Air pressure may be applied through the air tube 15 and into air plug 16. During operation, air directed by the air plug 16 may be used to aid ejection of a molded plastic cap off of the center core 10, such as by preventing formation of a vacuum between the molded cap and the upper assembly 102.

Coolant, such as water or other fluids, may be supplied through the bubbler inlet 21. The bubbler inlet may be defined by interior surfaces of the bubbler tube 14 and exterior surfaces of the air tube 15. The bubbler tube 14 may be configured to keep air and other gases out of the coolant. Coolant may flow from the bubbler inlet 21 to a plurality of center core inlets 22. The multiple center core inlets 22 may be defined by surfaces inside the center core 10. During operation, coolant may flow from the center core inlets 22 into internal channels 23 adjacent the cooling ring 11, with the internal channels 23 defined by the outer surface of the center core and a plurality of grooves in the inner surface of the cooling ring 11. Coolant may flow then into traversing channels 24 defined by a plurality of holes extending radially from an inner surface to an outer surface of the cooling ring 11. The orientation of the grooves forming the internal channels 23 and the traversing channels 24 in the cooling ring 11 are described in more detail below with reference to FIGS. 2 and 3.

To seal the coolant flow paths through the several parts to prevent leaks and air ingress, the assembly 100 may also include a number of O-ring seals between the various parts. For example, in FIG. 1A, the center core O-ring 17 forms a seal between the center core 10 and the cooling ring 11 preventing leakage of coolant flowing in internal channels 23 or entering traverse channels 24. Similarly, the cooling ring O-ring 18 forms a seal between the thread core 12 and the cooling ring 11 preventing leakage of coolant flowing in external channels 25 or exiting traverse channels 24. A mandrel O-ring 19 may form a seal at the top of the thread core 12. An air plug O-ring 20 may prevent coolant in the center core inlets 22 from entering the air plug and prevent air from entering the coolant.

Figure 1B:
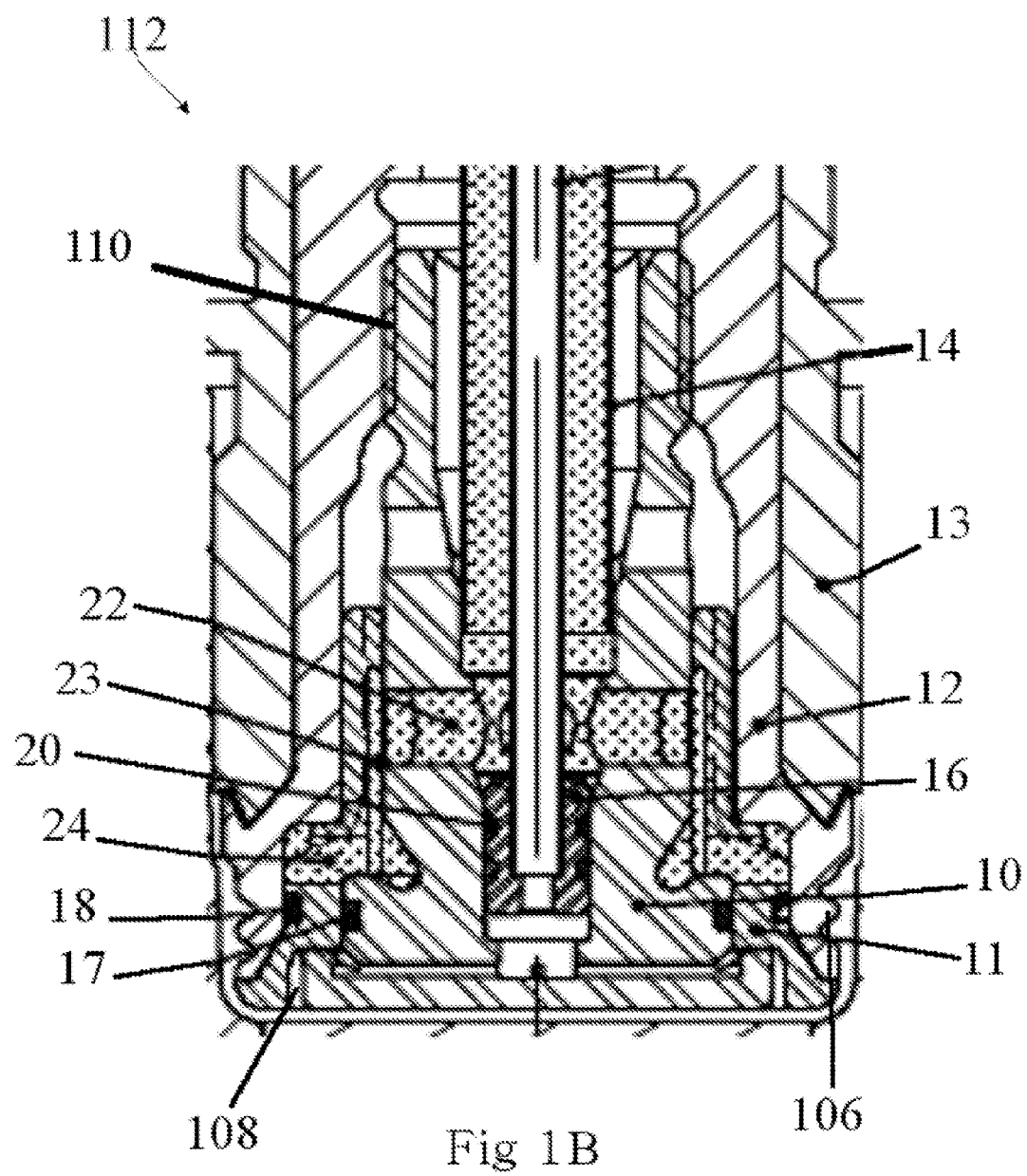
FIG. 1B is a close up view of the coolant flow path in the cavity stack of FIG. 1A.

FIG. 1B is a close up view of a portion of the assembly 100 shown FIG. 1A which better illustrates the coolant flow path 112 through the assembly in this embodiment. The coolant flow path 112 is defined by several surfaces of the center core 10, the cooling ring 11, and the thread core 12. Coolant flowing into the illustrated embodiment assembly, shown with a plus sign cross hatch, passes down through the bubbler tube 14 into the center core inlets 22 within the center core 10. Coolant flows out of the center core inlets 22 into the internal channels 23. The internal channels 23 are formed in the volume between longitudinal grooves in the inner surface of the cooling ring 11 and the outer surface of the center core 10. Coolant flows from the internal channels 23 into the traversing channels 24 that traverse the wall of the cooling ring 11 from the inner surface of the cooling ring 11 to the outer surface of the cooling ring 11. Upon exiting the traversing channels 24, the coolant may flow around the circumference of the cooling ring 11 in arcuate channels which direct the coolant to a return flow path through longitudinal flow paths formed by longitudinal grooves in the outer surface of the cooling ring 11, with the flow path being defined by the groove structure and an inner surface of the thread core 12.

FIG. 1B also illustrates features of the thread core 12. The thread core 12 may include external threads 106 configured for molding the closure threads of caps. The thread core 12 may also include internal assembly threads 110. The center core 10 may be assembled through the cooling ring 11 and engage the assembly threads 110 of the thread core 12. Such assembly may hold the three pieces together and form the coolant channels there between. When assembled, a plug seal gap 108 between the cooling ring 11 and the center core 10 is formed into which compressed plastic material flows during pressing operations.

Figure 2:
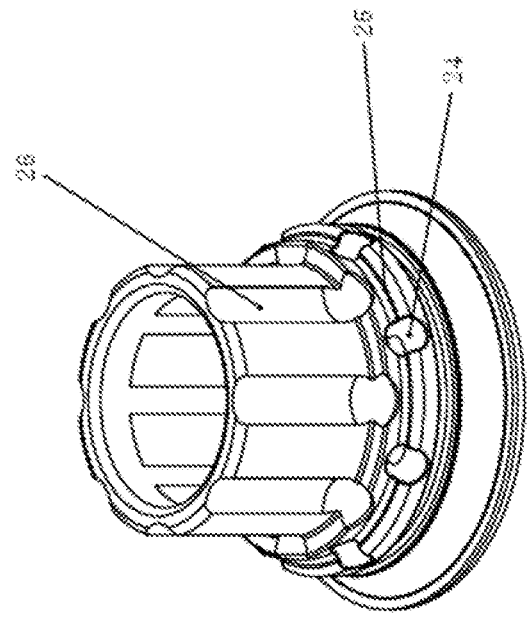
FIG. 2 is a perspective view of a cooling ring viewed from the bottom.
Figure 3:
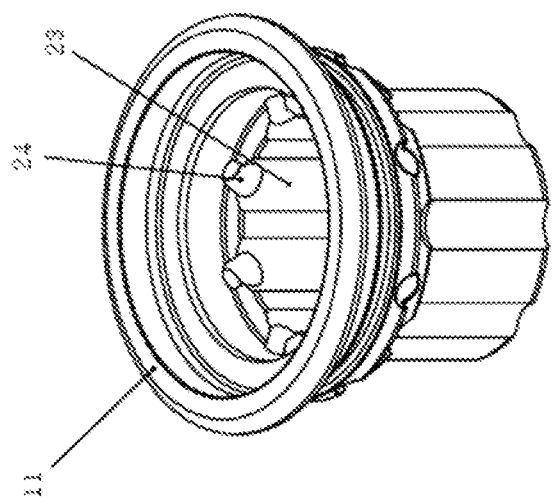
FIG. 3 is a perspective view of a cooling ring viewed from the top.

FIGS. 2 and 3 show the cooling ring 11 in isolation. Referring to FIG. 2, the internal flow channels 23 may be partially defined by grooves in the inner surface of the cooling ring 11. The other surface defining the internal channels 23 is the outer surface of the center core 10 when the center core 10 and cooling ring 11 are assembled together. As discussed above, the coolant flows vertically through the internal channels 23 formed between the center core 10 and the cooling ring 11 in the internal channels 23, and then radially outward through a plurality of traversing channels 24 that are holes passing through the wall of the cooling ring 11.

Referring to FIG. 3, coolant flowing from inside the cooling ring 11 through the traversing channels 24 flows into one or more arcuate channels 25 passing around the outside of the cooling ring 11. FIG. 3 shows these arcuate channels 25 formed by grooves in the outside surface of cooling ring 11. The other surface defining the arcuate flow channels is the inside of the thread core 12 when the thread core 12 and cooling ring 11 are assembled together. Coolant flow through the arcuate channels 25 to a plurality of longitudinal flow channels 26 on the outer surface of the cooling ring 11. These external longitudinal flow channels 26 are defined on one side by the longitudinal grooves labeled 26 on the outside of the cooling ring 11 and by the interior surfaces of the thread core 12 when the cooling ring 11 and thread core 12 are assembled together.

FIGS. 2 and 3 show an embodiment of the cooling ring 11 in which the ring is formed as a single component. However, in other embodiments the cooling ring may be an assembly comprising a plurality of components. For example, a plurality of components may be joined or sealed together, such as with additional O-rings, to form a composite cooling ring. One or more of the plurality of components may define the various channels as described with regard to the cooling ring 11.

Figure 4:
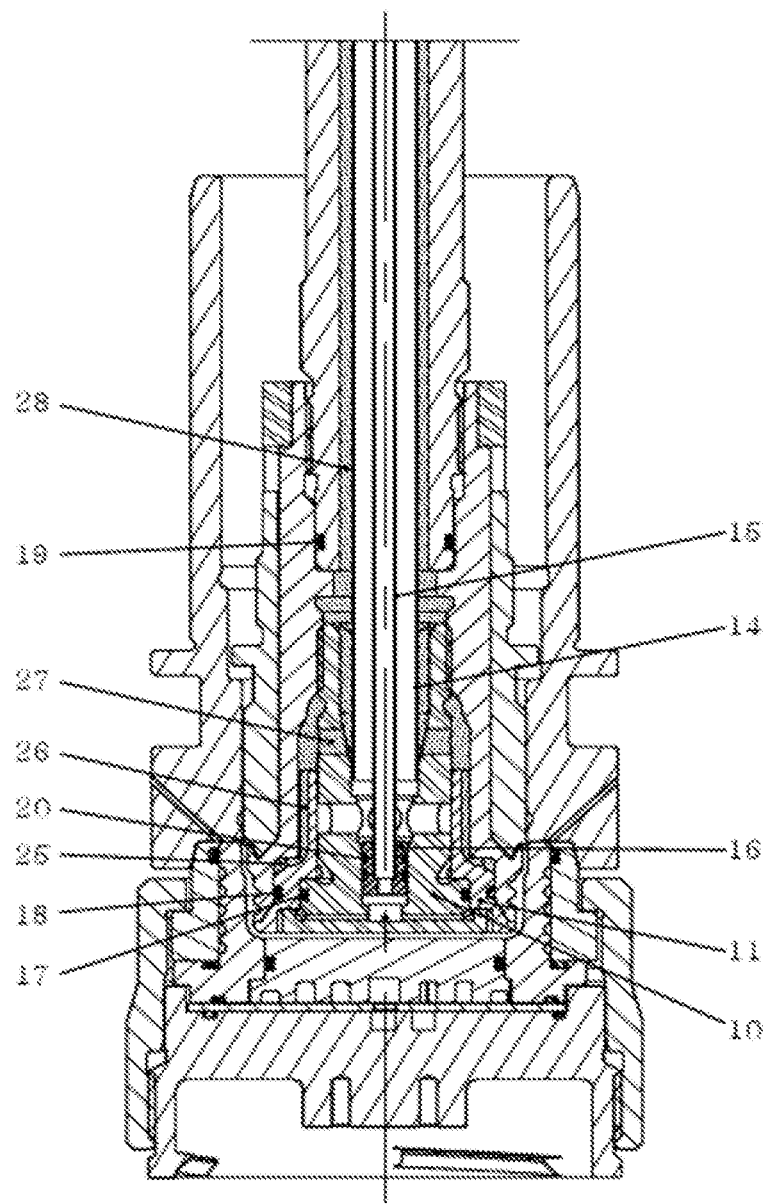
FIG. 4 is a cross sectional view of the cavity stack from FIG. 1A but rotated thirty degrees to show a coolant flow path out of the stack.

FIG. 4 illustrates the same exemplary molding assembly 100 as FIG. 1A but at a different angle of rotation about the longitudinal axis in order to reveal the flow path of coolant exiting the mold assembly 100. In FIGS. 1A and 1B, the assembly 100 is shown in a first orientation that shows the coolant flows into the assembly. In FIG. 4, the assembly is rotated thirty degrees to show the coolant exit flow paths which are thirty degrees apart from the inner flow paths 23 about the cooling ring 11. As shown in FIG. 4, in this embodiment coolant exits the traversing channels 24 and flows through the arcuate channels 25 around the cooling ring 11 before reaching external channels 26 where the flow is directed upward along the outer surface of the cooling ring 11. Again, details on the grooves in the cooling ring forming the external flow channels 26 are shown in FIGS. 2 and 3, including how these flow channels are offset from each other by an angle about the longitudinal axis. In the embodiment illustrated in the figures, this offset angle is approximately thirty degrees, but the angle may vary depending on the number of coolant channels in each stage of the assembly.

Coolant may flow from the external channels 26 into center core outlets 27. Multiple center core outlets 27 may be defined by surfaces inside the center core 10, similar to the center core inlets 22. The center core outlets 27 lead the coolant flow to the bubbler outlet 28 which directs the coolant flow out of the molding assembly 100. The bubbler outlet 28 flow path may pass through the volume defined by an outer surface of the bubbler tube 14 and an inner surface of the mandrel 36.

In the embodiment illustrated in the figures, coolant contacts the center core 10, cooling ring 11, and thread core 12 while passing through various volumes of the coolant flow path 112. This enables heat to be transferred from these parts to the coolant and removed from the assembly 100 as coolant flows out the bubbler outlet 28. Several stages in the coolant flow path 112 may include multiple channels. Multiple channels per stage may increase surface area contact with the parts and improve heat transfer. The multiple channels and flow paths may be designed or arranged to ensure an even heat distribution within the parts of the mold assembly, thereby preventing local hotspots from negatively affecting performance of the molding assembly 100 during high volume molding operations.

The various channels of the coolant flow path 112 may be sized with cross sectional areas designed to impart desirable coolant flow behavior. For example, the combined cross sectional area of the plurality of center core inlets 22 may be greater than the cross sectional area of the bubbler inlet 21. The combined cross sectional area of the internal channels 23 may be less than the cross sectional area of the bubbler inlet 21. The combined cross sectional area of the external channels 26 may be less than the combined area of the internal channels 23. These dimensional parameters can ensure even flow through the upper mold assembly 102 during operation.

The ratios of cross sectional areas between portions of the flow path may be configured to control coolant flow and thereby improve heat transfer. Each successive element or stage may have a flow area ratio to the preceding stage configured to improve heat transfer in each stage. Each flow area ratio may be relative to the cross sectional area of the bubbler inlet 21 or to another stage in the coolant flow path 112. For example, in an assembly with the flow area ratios described above, the center core inlets 23 may have a greater combined cross sectional area than other portions of the assembly. The subsequent portions of the coolant flow path through the upper assembly 102 may have a smaller combined cross sectional area corresponding with increased flow velocity and lower pressure with constant volumetric flow. Therefore, the coolant may experience a pressure gradient along the coolant flow path 112. This pressure gradient can be used to regulate the coolant flow through the upper assembly 102 and improve heat transfer from the mold elements to the coolant.

Alternate embodiments may include differently shaped center cores, cooling rings, or thread cores. These pieces may define different amounts or shapes of flow paths or channels. Embodiments that require more cooling may include a greater number of coolant channels. Alternatively, embodiments that require less cooling may include less coolant channels and thereby reduce the amount of coolant used. In further embodiments, some components illustrated and described herein as separate elements may be combined into single components exhibiting the same or similar features and performing the same or similar functions. Also, components illustrated and described herein as unitary structures may be formed as assemblies of multiple components.

Figure 5:
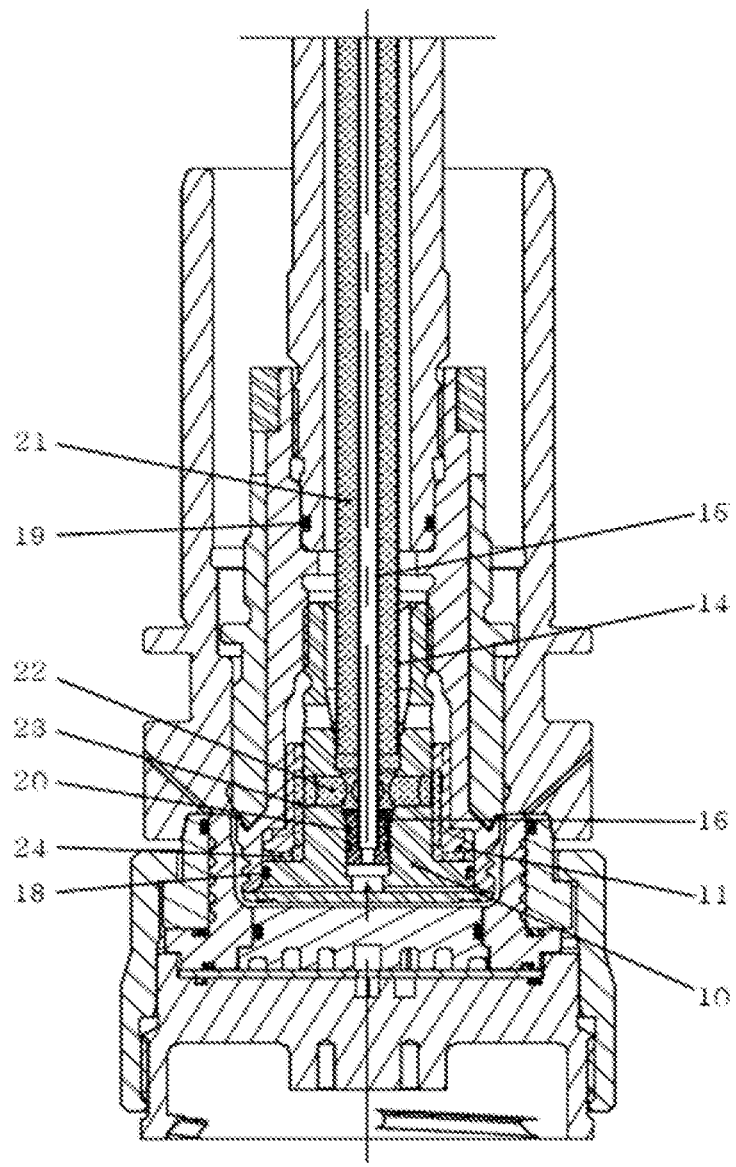
FIG. 5 is a cross sectional view of a cavity stack for producing a cap without a plug seal showing a coolant flow path into the stack.

FIG. 5 illustrates an alternate embodiment molding assembly. The embodiment assembly illustrated in FIG. 5 includes many of the same elements as the mold assembly 100 described above with reference FIGS. 1A, 1B 4. However, in the embodiment illustrated in FIG. 5, the central core 10 and cooling ring 11 are configured differently so that the bottom of the center core 10 extends all the way to the thread core 12. This embodiment may not include the plug seal gaps 108 shown in FIG. 1B, and therefore the caps produced will not have a plug seal. A plug seal may be a seal to fit inside the lip of a container coupled with a cap. In this embodiment, the cooling ring 11 may not directly contact the plastic material being molded. Heat may be transferred from the plastic material to the cooling ring 11 indirectly via the center core 10 or the thread core 12.

Figure 6:
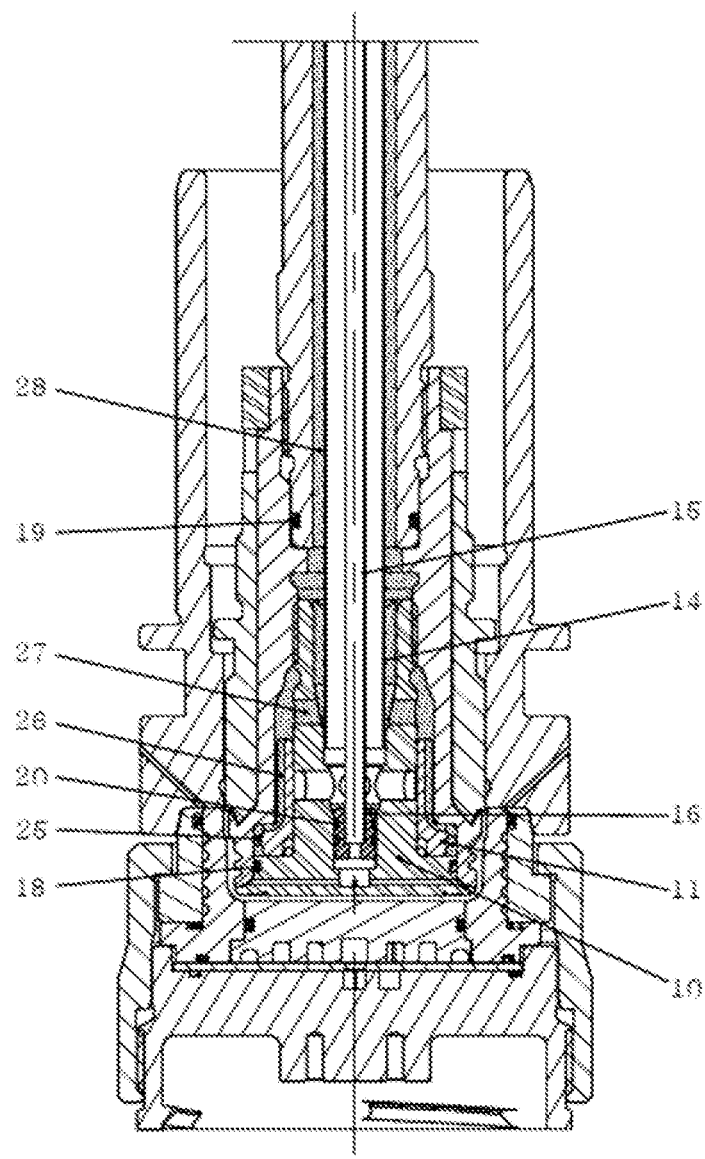
FIG. 6 is a cross sectional view of the cavity stack from FIG. 5 but rotated thirty degrees to show a coolant flow path out of the stack.

FIG. 6 illustrates the embodiment of FIG. 5 rotated thirty degrees to show the coolant's exit path from the upper assembly 102. As in FIG. 5, the assembly may not include plug seal gaps 108 and the cooling ring 11 may not be configured to contact the plastic material being molded.

Figure 7:
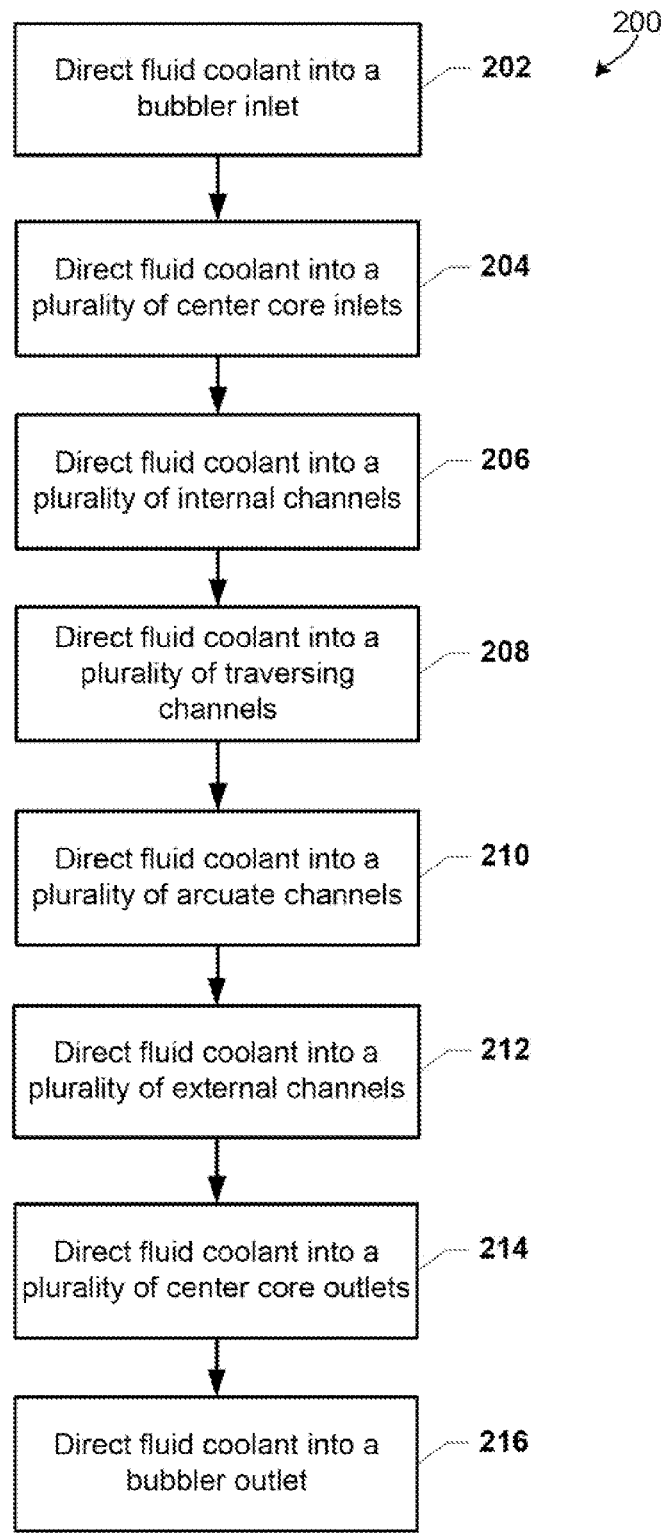
FIG. 7 is a process flow diagram of an embodiment method for cooling a compression molding device.

Further embodiments include methods of cooling a molding assembly. These embodiment methods may include directing fluid coolant through one or more of the structures discussed above while forming plastic parts by compression molding. FIG. 7 illustrates an embodiment method 200 in which fluid coolant is directed into various elements of the coolant flow path 112. Specifically, fluid coolant may be directed into or through a bubbler input in step 202, through a plurality of center core inlets in step 204, through a longitudinal flow path defined by plurality of internal grooves in the cooling ring in step 206, through a plurality of holes through the cooling ring in step 208, circumferentially through flow paths defined by a plurality of arcuate grooves in the cooling ring in step 210, through a longitudinal flow path defined by a plurality of external grooves in the cooling ring in step 212, through a plurality of center core outlets in step 214, and out of the assembly through a bubbler outlet in step 216.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A molding device for molding a plastic material, comprising:
   a center core concentric about a central axis of the molding device, the center core comprising a plurality of center core inlets and a plurality of center core outlets;
   a cooling ring disposed around the center core and concentric about the central axis of the molding device, the cooling ring comprising:
     a plurality of internal grooves extending in an axial direction on an inner surface of the cooling ring;
     a plurality of traversing channels extending between the inner surface of the cooling ring and an outer surface of the cooling ring
     a plurality of arcuate grooves; and
     a plurality of external grooves extending in the axial direction on the outer surface of the cooling ring and offset from the internal grooves by an angle about the central axis of the molding device; and
   a thread core concentric about the central axis of the molding device and disposed around the cooling ring,
   wherein the center core, the cooling ring, and the thread core are configured to define a fluid coolant flow path through which coolant may flow into the plurality of center core inlets, through a plurality of internal channels bounded by the plurality of internal grooves and the center core, through the plurality of traversing channels, through a plurality of arcuate channels bounded by the plurality of arcuate grooves and the thread core, through a plurality of external channels bounded by the plurality of external grooves and the thread core, and through the plurality of center core outlets.

2. The molding device of claim 1, further comprising:
   a bubbler coupled with the center core and comprising a bubbler inlet and a bubbler outlet,
   wherein the bubbler is configured to further define the fluid coolant flow path so that coolant flows in through the bubbler inlet through to the center core inlets, and
   wherein the bubbler is configured to further define the fluid coolant flow path so that coolant flows out from the center core outlets and out through the bubbler outlet.

3. The molding device of claim 2, wherein the center core, the cooling ring, and the thread core are configured to define the fluid coolant flow paths with cross sectional areas configured to control the coolant flow.

4. The molding device of claim 3, wherein the center core is configured so that the plurality of center core inlets have a larger combined cross sectional area than the bubbler inlet.

5. The molding device of claim 4, wherein the center core and the cooling ring are configured so that the plurality of internal channels have a smaller combined cross sectional area than the bubbler inlet.

6. The molding device of claim 5, wherein the thread core and the cooling ring are configured so that the plurality of external channels have a smaller combined cross sectional area than the plurality of internal channels.

7. The molding device of claim 6, wherein the center core is configured to mold caps.

8. The molding device of claim 7, wherein the thread core comprises external threads.

9. The molding device of claim 8, wherein the cooling ring is configured to directly contact the plastic material during a molding operation.

10. The molding device of claim 1, wherein the molding device is an injection molding device.

11. The molding device of claim 1, wherein the molding device is a compression molding device.

12. A method of cooling a molding device with a fluid coolant, the molding device comprising a bubbler, a center core, a cooling ring, and a thread core concentric about a central axis of the molding device, the method comprising:
   directing the fluid coolant into a bubbler inlet of the bubbler;
   directing the fluid coolant from the bubbler into a plurality of center core inlets of the center core;
   directing the fluid coolant from the center core inlets into a plurality of internal channels bounded by a plurality of internal grooves extending in an axial direction on an inner surface of the cooling ring and the center core;
   directing the fluid coolant from the plurality of internal channels into a plurality of traversing channels extending between the inner surface of the cooling ring and an outer surface of the cooling ring;
   directing the fluid coolant from the plurality of traversing channels into a plurality of arcuate channels bounded by a plurality of arcuate grooves of the cooling ring and the thread core;
   directing the fluid coolant from the plurality of arcuate channels into a plurality of longitudinal flow channels defined by external grooves of the cooling ring and the thread core, the external grooves extending in the axial direction on the outer surface of the cooling ring and offset from the internal grooves by an angle about the central axis;
   directing the fluid coolant from the plurality of longitudinal flow channels into a plurality of center core outlets of the center core; and
   directing the fluid coolant from the plurality of center core outlets into a bubbler outlet of the bubbler and out of the molding device.

13. The method of claim 12, wherein:
   the center core, the cooling ring, and the thread core are configured so that the plurality of center core inlets have a combined cross sectional area that is larger than the bubbler inlet;
   the center core and the cooling ring are configured so that the plurality of internal channels have a combined cross sectional area that is smaller than the bubbler inlet; and
   the thread core and the cooling ring are configured so that the plurality of external channels have a combined cross sectional area that is smaller than the plurality of internal channels.

14. The method of claim 12, further comprising molding plastic caps with the center core.

15. The method of claim 14, further comprising directly contacting the cooling ring with plastic material during a molding operation.

16. The method of claim 15, wherein the molding operation is an injection molding operation.

17. The method of claim 15, wherein the molding operation is an injection molding operation.

18. A method of manufacturing using a molding device, comprising:
   applying the molding device to a plastic material, wherein the molding device comprises:
      a center core concentric about a central axis of the molding device, the center core comprising a plurality of center core inlets and a plurality of center core outlets;
      a cooling ring disposed around the center core and concentric about the central axis of the molding device, the cooling ring comprising:
         a plurality of internal grooves extending in an axial direction on an inner surface of the cooling ring;
         a plurality of traversing channels extending between the inner surface of the cooling ring and an outer surface of the cooling ring
         a plurality of arcuate grooves; and
         a plurality of external grooves extending in the axial direction on the outer surface of the cooling ring and offset from the internal grooves by an angle about the central axis of the molding device; and
      a thread core concentric about the central axis of the molding device and disposed around the cooling ring,
      wherein the center core, the cooling ring, and the thread core are configured to define a fluid coolant flow path through which coolant may flow into the plurality of center core inlets, through a plurality of internal channels bounded by the plurality of internal grooves and the center core, through the plurality of traversing channels, through a plurality of arcuate channels bounded by the plurality of arcuate grooves and the thread core, through a plurality of external channels bounded by the plurality of external grooves and the thread core, and through the plurality of center core outlets.

19. The method of manufacturing of claim 18, wherein applying a molding device to a plastic material comprises an injection molding operation and the molding device is an injection molding device.

20. The method of manufacturing of claim 18, wherein applying a molding device to a plastic material comprises a compression molding operation and the molding device is a compression molding device.

21. The molding device of claim 1, wherein two or more of the center core, the cooling ring and the thread core are configured as a single component.

22. The molding device of claim 1, wherein the center core, the cooling ring and the thread core are configured as a single component.

23. The method of claim 12, wherein two or more of the bubbler, center core, cooling ring, and thread core are configured as a single component.

24. The method of claim 12, wherein the bubbler, center core, cooling ring, and thread core are configured as a single component.

25. The method of manufacturing of claim 18, wherein two or more of the center core, cooling ring, and thread core are configured as a single component.

26. The method of manufacturing of claim 18, wherein the center core, cooling ring, and thread core are configured as a single component.

* * * * *